United States Patent
Jayaraman et al.

(10) Patent No.: US 8,218,616 B2
(45) Date of Patent: Jul. 10, 2012

(54) METHOD AND SYSTEM FOR ADDITION OF VIDEO THUMBNAIL

(75) Inventors: Shankar Jayaraman, Karnataka (IN); Rajeev Verma, Karnataka (IN)

(73) Assignee: Samsung Electronics Co., Ltd (KR)

( * ) Notice: Subject to any disclaimer, the term of this patent is extended or adjusted under 35 U.S.C. 154(b) by 1277 days.

(21) Appl. No.: 11/771,564

(22) Filed: Jun. 29, 2007

(65) Prior Publication Data
US 2008/0005128 A1    Jan. 3, 2008

(30) Foreign Application Priority Data

Jun. 30, 2006  (IN) .............................. 1127/CHE/2006
Jun. 29, 2007  (KR) ........................ 10-2007-0064910

(51) Int. Cl.
*H04B 1/66* (2006.01)
*G06F 3/00* (2006.01)
*G06F 13/00* (2006.01)
*H04N 5/445* (2011.01)

(52) U.S. Cl. ......................................... 375/240; 725/37
(58) Field of Classification Search ................... None
See application file for complete search history.

(56) References Cited

U.S. PATENT DOCUMENTS

| | | | | |
|---|---|---|---|---|
| 2004/0205627 A1* | 10/2004 | Rosenholtz et al. | ........... | 715/526 |
| 2004/0205629 A1* | 10/2004 | Rosenholtz et al. | ........... | 715/526 |
| 2006/0064716 A1* | 3/2006 | Sull et al. | .......... | 725/37 |
| 2006/0107289 A1* | 5/2006 | DeYonker et al. | ............ | 725/37 |
| 2007/0237225 A1* | 10/2007 | Luo et al. | ................. | 375/240.12 |

* cited by examiner

*Primary Examiner* — Shin-Hon Chen
(74) *Attorney, Agent, or Firm* — The Farrell Law Firm, P.C.

(57) ABSTRACT

Provided is a method and system to generate a static or an animated thumbnail for a digital video on a handheld device, in which a first frame of the video is displayed as the static thumbnail and certain periodic frames of the digital video are displayed as the animated thumbnail.

15 Claims, 4 Drawing Sheets

METHOD AND SYSTEM FOR ADDITION OF VIDEO THUMBNAIL

PRIORITY

This application claims priority under 35 U.S.C. §119(a) to applications entitled "A METHOD AND SYSTEM FOR ADDITION OF VIDEO THUMBNAIL" filed in the Indian Intellectual Property Office on Jun. 30, 2006, assigned India Serial No. 1127/CHE/2006, and filed in the Korean Intellectual Property Office on Jun. 29, 2007, assigned application serial number 10/2007/064910, the content of each of which are incorporated herein by reference.

BACKGROUND OF THE INVENTION

1. Field of the Invention

The present invention, in general, relates to the field of multimedia communication and, in particular relates to Multimedia technology in handheld devices. The invention proposes adding a static thumbnail and a dynamic thumbnail to a video recorded in MP4 format with specific use-cases and advantages for each.

2. Description of the Related Art

Static Thumbnail—Video-based applications that need a first frame of the video to display (i.e. static thumbnail) require the video to be decoded. On a handheld device having limited processor speed and memory capabilities, this process typically involves the steps shown in FIG. 1.

After a caller requests a static thumbnail in Step 102 of FIG. 1, an entire MP4 (also referred to as MPEG4 or Moving Pictures Expert Group-4) video file is parsed to obtain the various 'atoms', i.e. video atoms, which is the MP4 file format in which specified data is to be stored, in Step 104 of FIG. 1. In Step 106, decoding and calculating the location of the video data stream that starts with an I-frame is performed, and a first frame is located and data is extracted in Step 108. The Video data stream is passed to the Decoder (usually a DSP or a backend processor in a handheld device), the video decoder is initialized and extracted data is passed in Step 110. Then, in Step 112, a first video frame is obtained from the Decoder and passed to the application. The Decoder is stopped in Step 116.

However, the above process requires a significant amount of time, especially on low power handheld devices. Further, the video decoding requires hardware support, which requires additional battery life, which can be depleted to obtain the first frame alone.

Animated thumbnail—Currently an animated video thumbnail is unavailable in a MP4 file. The above-described conventional technology suffers from the following limitations. Thumbnail display of video (by decoding and getting the first frame method) takes more time compared to the present invention. In devices where many thumbnails need to be displayed on a particular screen, the time can be considerable. On handheld devices, video decoding requires additional hardware/DSP support. To obtain the first frame alone, the hardware needs to be initialized, run and shutdown again—leading to consumption of additional power and battery drain. In addition, a user doesn't have an option to preview the video by playing back only a few selected frames. For very long videos, the user doesn't have an option, but must play back or doing a manual fast-forward manually. Conventional methods do not provide a very good user experience since the user must wait until all the video thumbnails are displayed, as in described above.

SUMMARY OF THE INVENTION

An aspect of exemplary embodiments of the present invention is to address at least the problems and/or disadvantages and to provide at least the advantages described below.

The MP4 file format requires data to be encapsulated in the form of 'atoms' where each atom holds specific information. The format also supports user defined atoms too. While decoding the video, if the video decoder/parser doesn't understand the signature of an atom, that atom is completely ignored. This feature is utilized in the present invention. The present invention adds a static thumbnail in an MP4 video file during/after encode for quick decode and display in a handheld device. The present invention adds an animated thumbnail in an MP4 video file that will display an animated preview of the video with a few chosen frames.

The static video thumbnail is used to display the first frame of the video and the animated thumbnail will be used to perform a preview of a video by only playing back a few selected frames.

Accordingly, the present invention provides a method for adding video thumbnail in a video file including adding a static thumbnail in the video file during or after encoding for quick decode and display in a handheld device; and adding an animated thumbnail for displaying an animated preview of the video with a plurality of chosen frames.

The present invention further provides a method of accessing a video thumbnail including parsing the video file for the thumb atom; extracting the data from the thumb atom based on the value of thumbnail size; accessing a thumbnail header and finding the type of thumbnail; and passing the data to an image decoder based on the type of thumbnail.

The present invention still further provides a system for adding video thumbnail in a video file, the system including generator for adding a static thumbnail in the video file during or after encoding for quick decode and display in a handheld device; and generator for adding an animated thumbnail for displaying an animated preview of the video with a plurality of chosen frames.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF THE PREFERRED EMBODIMENTS

Preferred embodiments of the present invention are explained with reference to the accompanying drawings. It should be understood however that the disclosed embodiments are merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional details are not described in order not to unnecessarily obscure the present invention in detail.

Figure 1:
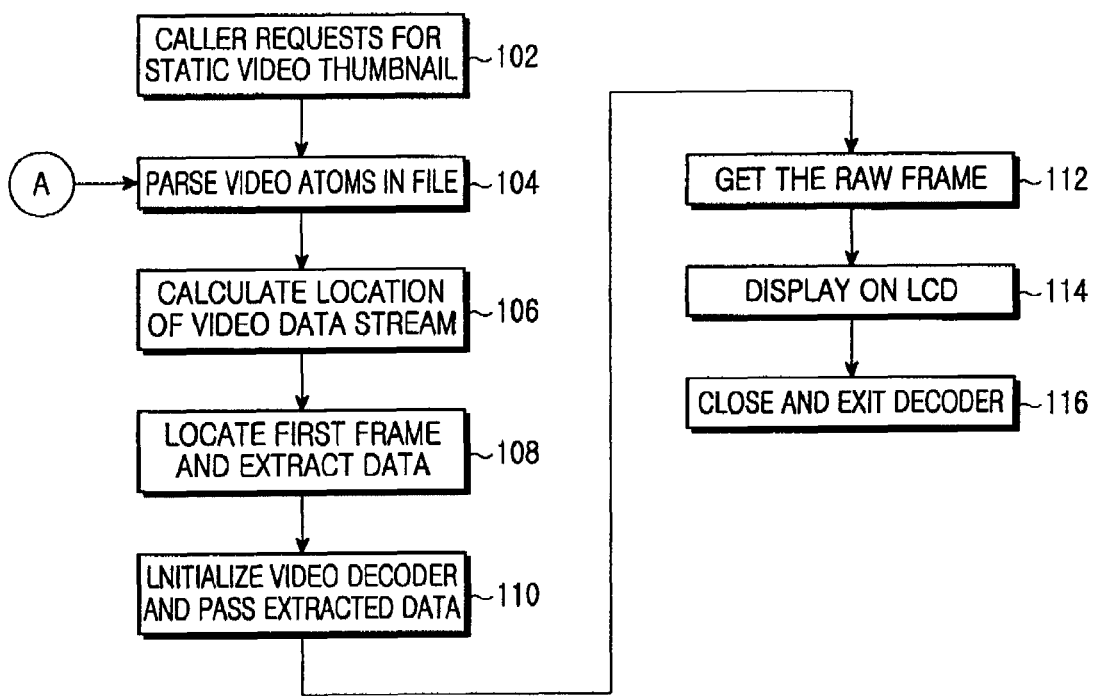
FIG. 1 is a flowchart of a conventional method to get the static thumbnail from an MP4 video file.

As described above, displaying the first frame of a video (static thumbnail) in a handheld device using conventional technology has a number of disadvantages. There also is no option to preview the video by just playing back only few selected frames, to give the user an overview of the video. FIG. 1 shows the steps involved in obtaining the first frame of the video.

The invention adds thumbnails to a MP4 video file during recording/encoding and uses the thumbnails for decoding the first frame or for video preview.

Figure 3:
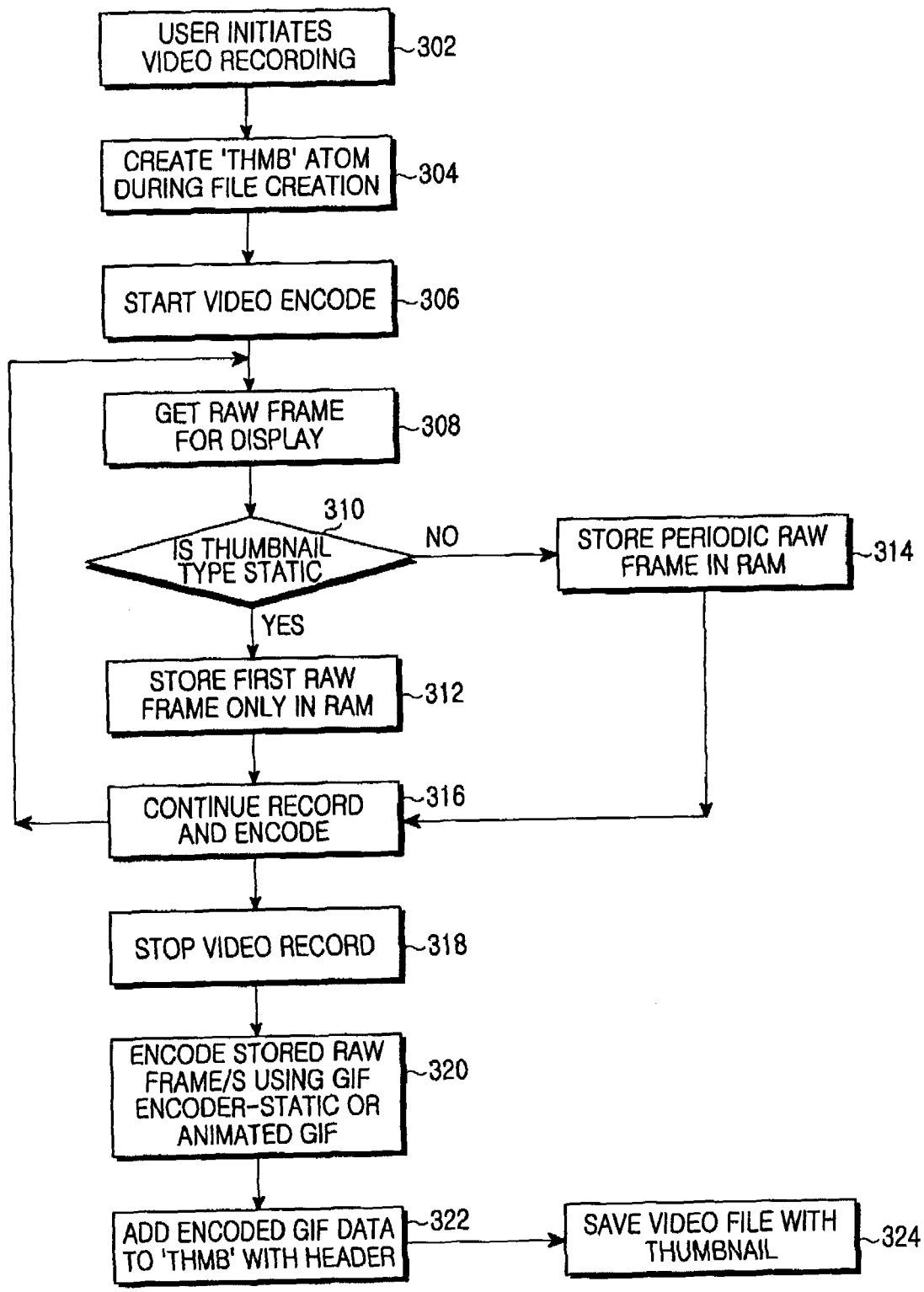
FIG. 3 is a flowchart illustrating adding the static/animated thumbnail to the video file during encoding.

Referring to FIG. 3, which outlines steps involved in adding a video thumbnail during recording, it is noted that, as explained earlier, there could be two types of thumbnails. The steps for adding a thumbnail to the video for each type of thumbnail and for accessing the thumbnail from an MP4 file are as described below. In regard to the static thumbnail, when the recording is initiated in Step 302 of FIG. 3 and the MP4 file is created, a special thumbnail atom thumb with suitable amount of data space is added to the file. The size of the data space allocated depends on the encoder format chosen for the thumbnail and the dimension of the encoded data. The value of the dimension is set so that decoding of the thumbnail frame does not take any considerable time at all. For this, a 'thumb' atom is created during file creation in Step 304, and video encoding is started in Step 306. Then, during video encoding, a raw frame for display is acquired and provided to an application for addition of a thumbnail according to the present invention in Step 308.

Video recording in a handheld device typically involves the camera/encoder module giving a raw frame for display/preview followed by an encoded frame for storage. During acquisition of the raw frame, whether the type of a requested thumbnail is a static thumbnail or a dynamic thumbnail is determined in Step 310. The application will proceed to step 312 if the requested thumbnail is a static thumbnail, and proceeds to step 314 if the requested thumbnail is a dynamic thumbnail. When the first raw frame is received, the application stores it in RAM (step 312). The application stores periodic raw frames in RAM in Step 314.

The video recording/encoding continues in Step 316. When the recording is completed in Step 318, the raw frame saved earlier using either a Joint Photography Experts Group (JPEG) photo compression standard encoder or a Graphical Interchange Format (GIF, i.e. an encoded image format that can store both single as well as multiple image frames) encoder is encoded in Step 320 with a very small resolution so that the decoding and display occurs very quickly without burdening memory restrictions of the handheld device. A 4-byte header is added to the encoded raw frame with the following details in the video thumbnail header.

i. Byte 1: Thumbnail size—size of the video thumbnail–header+data space.
 ii. Byte 2: Thumbnail encode format—The values
  1. 0—JPEG
  2. 1—GIF
  3. 2—Animated GIF
  4. 3—PNG
  5. 4—BMP iii. Byte 3: Thumbnail Width
 iv. Byte 4: Thumbnail Height The thumbnail with such header is added to the thumb data space defined in the MP4 file in Step 322, and the video file is saved with the static video thumbnail in Step 324.

In regard to animated thumbnails, when the recording is initiated and the MP4 file is created, a special thumbnail atom thumb with suitable amount of data space, is added to the file. The size of the data space allocated depends on the encoder format chosen for the thumbnail, the number of frames in the animated thumbnail and the dimension of the encoded data.

Video recording in a handheld device typically involves the camera/encoder module giving a raw frame for display/preview followed by an encoded frame for storage. For an animated thumbnail, periodic raw frames from the camera module are stored in RAM. The number of raw frames stored is limited to a maximum of 100 to avoid an overly large the animated thumbnail size. When the recording is complete, encode the raw frames that were stored in RAM are encoded using a GIF encoder into an animated GIF data in Step 320. As explained above, a header for the animated thumbnail data with the format as '2' (animated GIF), with the width and height specified, is added to the thumb data space defined in the MP4 file in Step 322. The video file is saved with the animated video thumbnail in Step 324.

Figure 2:
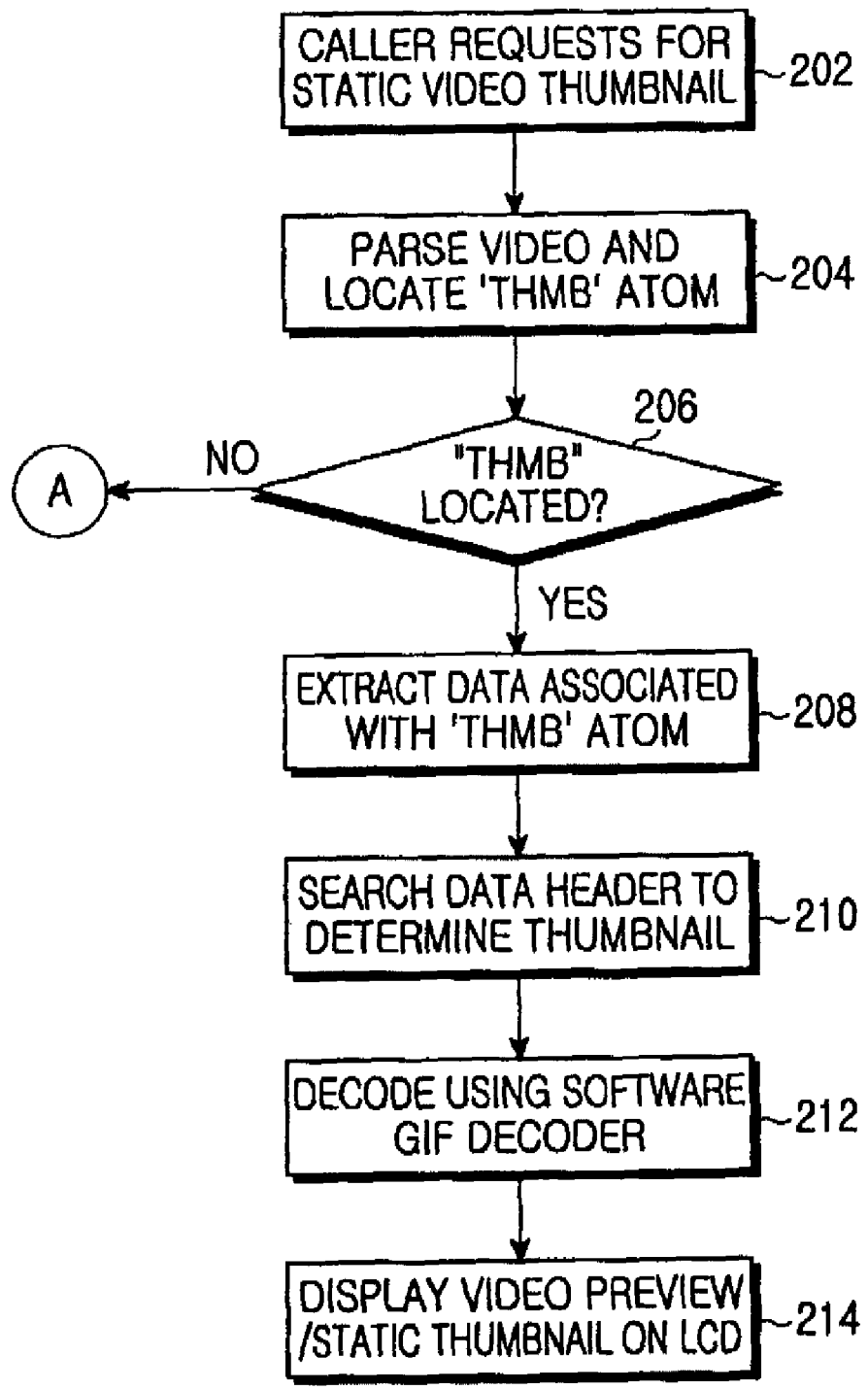
FIG. 2 is a flowchart showing steps of the present invention to get static video or animated video thumbnail.

In regard to accessing a video thumbnail, reference is made to FIG. 2, which outlines the steps involved in accessing and decoding a video thumbnail. When the thumbnail needs to be accessed, either for displaying the first frame or for video preview, the video file is parsed for the thumb atom in Step 204. At this time, locating the thumb atom is performed. Then, whether the location of the thumb atom has been detected is determined in Step 206. If the location of the thumb atom has not been detected, the process proceeds to "A" in FIG. 1, and conventional steps for displaying of a predetermined frame are performed. If the location of the thumb atom has been detected, the process proceeds to Step 208, and data from the thumb atom based on the value of thumbnail size is extracted. The Thumbnail Format byte is accessed to determine the type of thumbnail in Step 210. If the thumbnail format is static, it is passed to the image decoder (GIF or JPEG) based on the determined Thumbnail format in step 212. If the thumbnail format is animated, the data is passed to an image decoder that displays the animated GIF image in Step 212. Finally, the static or animated thumbnail for video preview is displayed on the LCD in Step 214.

Figure 4:
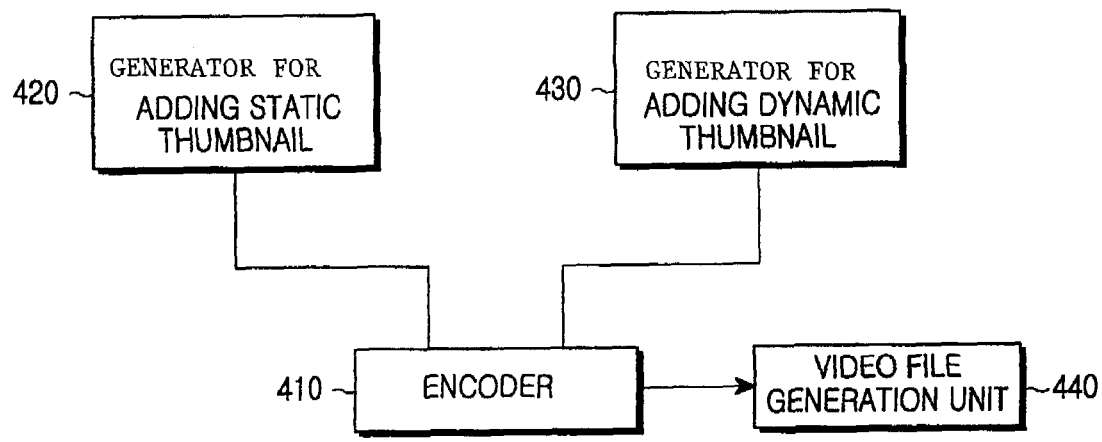
FIG. 4 is a block diagram representing a system for adding a video thumbnail according to an embodiment of the present invention.

FIG. 4 is a block diagram representing a system for adding a video thumbnail according to an embodiment of the present invention. Referring to FIG. 4, a system for adding a video thumbnail according to an embodiment of the present invention includes an encoder 410, generator for generating and adding a static thumbnail 420, generator for generating and adding a dynamic thumbnail 430 and a video file generation unit (44).

Generating and adding a static thumbnail 420, when the recording is initiated and the MP4 file is created, adds a special thumbnail atom "thumb" with suitable amount of data space to the file. Generating and adding a static thumbnail 420 acquires a raw frame for display during video encoding and stores it in RAM (not shown).

An encoder 410 performs video encoding, and the generator for generating and adding a static thumbnail 420 acquires the raw frame from the encoder 410.

When the recording is completed, the generator for generating and adding a static thumbnail 420 encodes the raw frame stored earlier using either a JPEG encoder or GIF encoder with a very small resolution so that the decoding and display occurs very quickly (without burdening the memory restrictions of the handheld device). Then, the generator for generating and adding a static thumbnail 420 adds a header for the static thumbnail data to generate a video thumbnail. The generator for generating and adding a static thumbnail 420 transfers the generated video thumbnail to the video file generation unit 440. The video file generation unit 440 adds the thumbnail with the header to the "thumb" data space defined in the video file.

The generator for generating and adding a dynamic thumbnail 430, when the recording is initiated and the MP4 file is created, adds a special thumbnail atom "thumb" with suitable amount of data space to the file. The generator for generating and adding a dynamic thumbnail 430 acquires periodic raw frames for preview during video encoding and stores it in RAM (not shown).

When the recording is completed, the generator for generating and adding a dynamic thumbnail 430 encodes the raw frames using a GIF encoder into an animated GIF data.

Then, the generator for generating and adding a dynamic thumbnail 430 adds a header for the dynamic thumbnail data to generate a video thumbnail. The generator for generating and adding a dynamic thumbnail 430 transfers the generated video thumbnail to the video file generation unit 440. The video file generation unit 440 adds the thumbnail with the header to the "thumb" data space defined in the video file.

As explained in the sections above, video preview and static video thumbnail using the method described in this invention increases the user's experience. Further, the features can be realized without the OEMs having to provide additional hardware, or batteries to overcome power drain of conventional devices.

The present invention provides advantages that include quickly decoding of a first frame to obtain a static thumbnail, eliminating the need for hardware decoders for video preview and obtaining a first frame, and saving battery life.

Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart therefrom.

What is claimed is:

1. A method of adding video thumbnails in a video file, the method comprising the steps of:
    adding a data space to the video file when recording of the video file is initiated and the video file is created;
    separately storing data of at least one of a static thumbnail and an animated thumbnail of the video file during the recording of the video file; and
    adding the at least one of a static thumbnail and an animated thumbnail of the video file with at least one corresponding header in the data space of the video file during or after encoding for quick decoding and display in a handheld device;
    wherein the animated thumbnail displays an animated preview of the video file utilizing a plurality of chosen frames.

2. The method as claimed in claim 1, wherein the adding and storing steps comprise:
    starting recording the video;
    adding to the file a thumbnail atom thumb with the data space when recording is initiated and the video file is created;
    providing a raw frame for display/preview followed by an encoded frame for storage;
    storing in memory when a raw frame is received by an application;
    encoding the raw frame saved earlier when the recording is complete;
    adding a header to the encoded raw frame;
    adding the thumbnail with the header to the data space of the thumb defined in the video file; and
    saving the video file with the static video thumbnail.

3. The method as claimed in claim 2, wherein an amount of data space allocated depends on an encoder format chosen for a thumbnail and the dimension of the encoded data.

4. The method as claimed in claim 1, wherein the adding and storing steps comprise:
    adding to the file a thumbnail atom thumb with the data space when recording is initiated and the video file is created;
    storing periodic raw frames to memory;
    encoding the raw frames that were stored in memory when the recording is complete;
    adding a header to the encoded raw frame;
    adding the thumbnail with the header to the data space of the thumb defined in the video file; and
    saving the video file with the animated video thumbnail.

5. The method as claimed in claim 4, wherein an amount of data space allocated depends on an encoder format chosen for the thumbnail, a number of frames in the animated thumbnail and a dimension of the encoded data.

6. The method as claimed in claim 1, wherein the header added in the data space of the video file includes information on a size, an encoder format, a width and a height of the thumbnail.

7. A method of accessing a video thumbnail, the method comprising the steps of:
    parsing a video file for a thumb atom, wherein the thumb atom has data space that was created when recording of the video file is initiated and the video file is created, and the thumb atom comprises data that was separately stored during recording of the video file;
    extracting data from the thumb atom based on a value of thumbnail size;
    accessing a thumbnail header and finding a type of thumbnail; and
    passing the data to an image decoder based on the type of thumbnail.

8. The method as claimed in claim 7, wherein the thumbnail header includes information on a size, an encoder format, a width and a height of the thumbnail.

9. A system for adding video thumbnail in a video file, the system comprising:
    a first generator for separately storing data of a static thumbnail of the video file during the recording of the video file, and adding the static thumbnail of the video file in preset data space of the video file during or after encoding for quick decode and display in a handheld device; and
    a second generator for separately storing data of an animated thumbnail of the video file during the recording of the video file, and adding the animated thumbnail of the video file in the preset data space of the video file for displaying an animated preview of the video utilizing a plurality of chosen frames.

10. The system as claimed in claim 9, wherein a header is added in the preset data space of the video file, and the header includes information on a size, an encoder format, a width and a height of the thumbnail.

11. A method of adding video thumbnails in a video file, the method comprising the steps of:
- generating a single video file in which encoded video frames are to be stored, the single video file including a data space in which a static or animated thumbnail is to be stored;
- encoding raw video frames and storing the encoded video frames in the single video file during recording of the single video file;
- selecting at least one of the raw video frames;
- generating the static or animated thumbnail by encoding the at least one raw video frame;
- adding the static or animated thumbnail and a header having information on a size of the static or animated thumbnail in the data space of the single video file so that the encoded video frames, the static or animated thumbnail and the header can be stored in the single video file.

12. The method as claimed in claim 11, wherein an amount of the data space depends on an encoder format chosen for the static or animated thumbnail and the size of the static or animated thumbnail.

13. The method as claimed in claim 11, wherein the at least one raw video frame is periodically selected.

14. The method as claimed in claim 11, wherein an amount of the data space depends on an encoder format chosen for the animated thumbnail, a number of frames in the animated thumbnail and the size of the animated thumbnail.

15. The method as claimed in claim 11, wherein the header added in the data space of the single video file includes information on a size, an encoder format, a width and a height of the static or animated thumbnail.

* * * * *